US010230774B2

(12) United States Patent
Saez

(10) Patent No.: US 10,230,774 B2
(45) Date of Patent: Mar. 12, 2019

(54) VIRTUAL MEETING ATTENDEE

(71) Applicant: Microsoft Technology Licensing, LLC, Redmond, WA (US)

(72) Inventor: William Nain Saez, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 190 days.

(21) Appl. No.: 15/159,677

(22) Filed: May 19, 2016

(65) Prior Publication Data

US 2017/0339199 A1  Nov. 23, 2017

(51) Int. Cl.
*H04L 29/06* (2006.01)
*G06Q 10/10* (2012.01)
*H04M 1/03* (2006.01)
*H04N 7/14* (2006.01)

(52) U.S. Cl.
CPC ..... *H04L 65/4015* (2013.01); *G06Q 10/1095* (2013.01); *H04L 65/403* (2013.01); *H04M 1/03* (2013.01); *H04N 7/147* (2013.01); *H04M 2201/405* (2013.01); *H04M 2250/52* (2013.01)

(58) Field of Classification Search
CPC .... H04M 2201/40; H04M 3/56; H04M 3/565; H04M 3/562; H04M 2203/50; H04M 2203/5009
USPC ............ 379/202.01, 203.01, 204.01, 201.01, 379/88.01
See application file for complete search history.

(56) References Cited

U.S. PATENT DOCUMENTS

| 5,491,743 A | 2/1996 | Shiio et al. |
| 6,629,129 B1 | 9/2003 | Bookspan et al. |
| 8,214,395 B2 | 7/2012 | Stevens et al. |
| 8,892,629 B2 | 11/2014 | Raju |
| 2005/0086540 A1 | 4/2005 | Gunter et al. |
| 2009/0181659 A1 | 7/2009 | Stalnacke et al. |
| 2009/0313329 A1 | 12/2009 | Agrawal et al. |
| 2011/0107236 A1 | 5/2011 | Sambhar |
| 2014/0201400 A1 | 7/2014 | Beel et al. |

(Continued)

FOREIGN PATENT DOCUMENTS

| CN | 101102211 A | 1/2008 |
| CN | 101364886 A | 2/2009 |

OTHER PUBLICATIONS

Boog, Jason, "How to Share Documents in a Google+ Hangout", Published on: Mar. 15, 2012 Available at: http://www.adweek.com/galleycat/how-to-share-documents-in-a-google-hangout/49498.

*Primary Examiner* — Thjuan K Addy
(74) *Attorney, Agent, or Firm* — Alleman Hall Creasman & Tuttle LLP

(57) ABSTRACT

A virtual meeting attendee includes a scheduling interface operatively coupled to a computerized meeting platform and configured to enable the virtual meeting attendee to be scheduled into meetings as a participant by users of the computerized meeting platform. The virtual meeting attendee also includes a content preparation machine configured, when the meeting attendee has been scheduled into a meeting as a participant, to receive meeting-associated content from computing devices of other participants scheduled into the meeting and output the meeting-associated content for display via a display device associated with the virtual meeting attendee.

20 Claims, 7 Drawing Sheets

(56) References Cited

U.S. PATENT DOCUMENTS

| | | | |
|---|---|---|---|
| 2015/0085058 A1* | 3/2015 | Zhang | H04N 7/142 |
| | | | 348/14.02 |
| 2015/0111551 A1 | 4/2015 | Kaye et al. | |
| 2015/0154291 A1 | 6/2015 | Shepherd et al. | |
| 2016/0073059 A1* | 3/2016 | Bader-Natal | H04N 7/15 |
| | | | 348/14.03 |

* cited by examiner

| MEETING A | | | |
|---|---|---|---|
| FRIDAY, 4/22, 10AM | | | |
| INVITED USERS | CONFIRMED USERS | AVAILABLE VENUES | SCHEDULED VENUE |
| USER 1<br>USER 2<br>USER 3<br>USER 4<br>USER 5<br>VM ATTENDEE | USER 2<br>USER 3<br>USER 4<br>USER 5<br>VM ATTENDEE | CONFERENCE ROOM A<br>CONFERENCE ROOM C<br>MEETING ROM 7<br>CONFERENCE ROOM E | CONFERENCE ROOM C — 204 |

VIRTUAL MEETING ATTENDEE

BACKGROUND

Computer-implemented meeting solutions allow users to virtually communicate and interact over long distances. Such meeting solutions allow users to exchange two-way audio and/or video streams, allowing two or more users to communicate without requiring the users to be in the same physical location. The ability to have content from one device displayed on another device is a common feature, but setting up and using that feature can be difficult and time consuming. Also, the feature may be unavailable for certain types of source devices.

BRIEF DESCRIPTION OF THE DRAWINGS

FIG. 2 depicts an example meeting interface showing details of a scheduled meeting.

DETAILED DESCRIPTION

Figure 1:
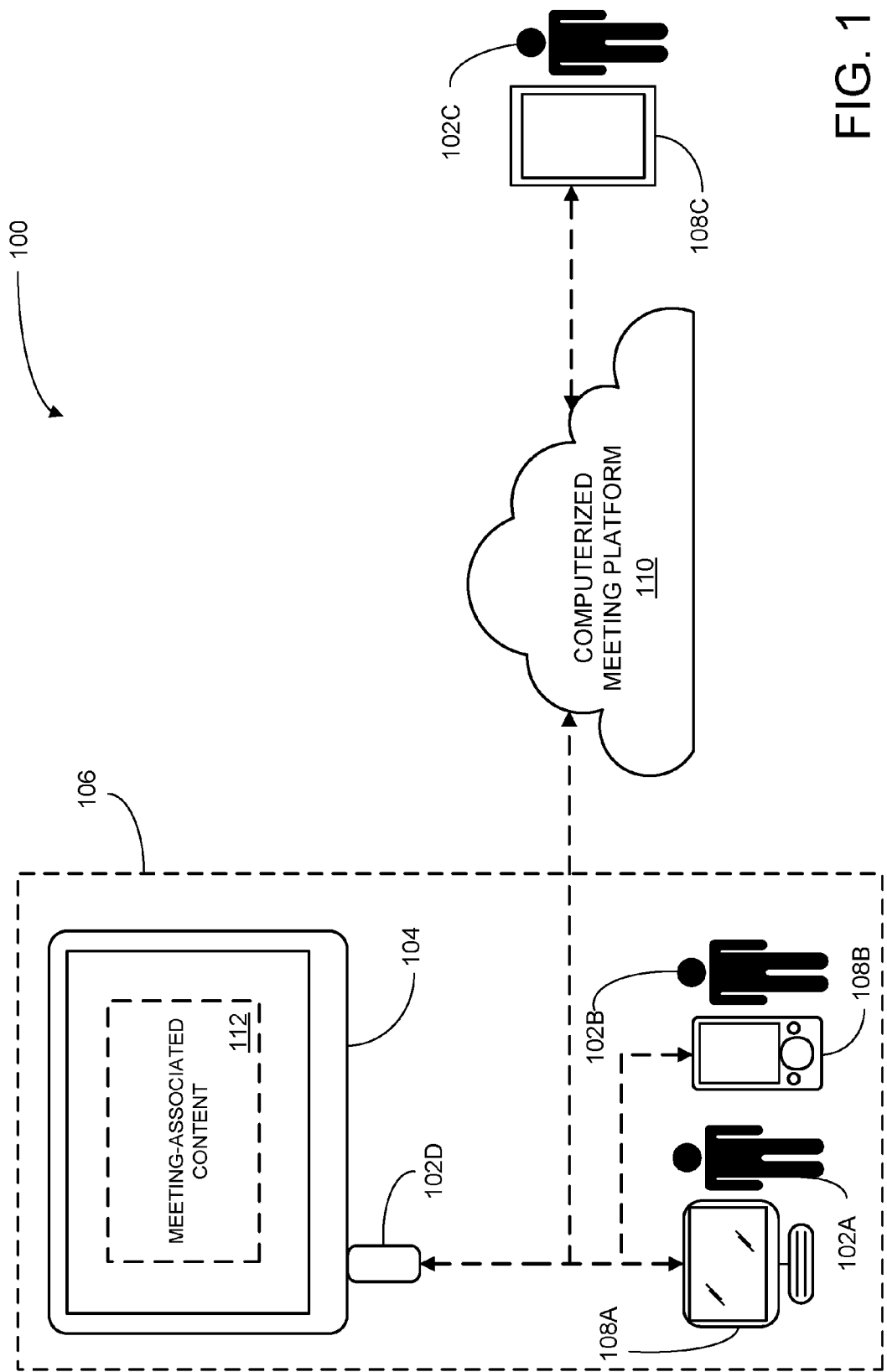
FIG. 1 schematically depicts an example meeting including a virtual meeting attendee.

Meetings often include multiple meeting participants, in many cases with remote attendees that participate electronically from other physical locations. Such meetings may be facilitated by a computerized meeting platform, allowing remote meeting participants to communicate with local participants via content streams (digital, audio, etc.) transmitted via a network. One example of a computerized meeting platform is a platform that users interface with via client software that includes functions such as calendar, email, notes, and the like, where the calendar function plays a role in scheduling and facilitating meetings. As part of this platform, or another platform, a communication client may be used to share video, share screen display/activity, share audio, etc., from devices within, or remote from, the physical location of the meeting.

In a typical meeting scenario, one or more meeting participants may be locally present in a meeting environment (e.g., a conference room), and, as indicated above, may communicate with one or more remote participants through use of computing devices. Such computing devices may include microphones, cameras, speakers, and/or any other components usable for capturing audio/video in the meeting environment, and relaying audio/video sent by the remote meeting participants. It is also typical that existing content (i.e. content other than that captured contemporaneously in the meeting) may be shared between local and remote devices. Content may also be transmitted between remote participants, and from a remote participant to a local participant.

Additionally, meeting participants frequently make use of display devices for showing meeting-associated content. For example, a meeting location may include one or more display devices, which meeting participants may use to present pictures, videos, documents, spreadsheets, slideshows, and/or any other displayable content to meeting participants locally present in the meeting location. However, in order to present meeting-associated content on a display device (e.g., a large wall-mounted display in a conference room), a meeting participant typically has to connect their source device to the target display device via one or more display cables, activate/install drivers, configure both devices to make use of a wireless presentation service, or take other steps. If the meeting participant's computing device is not compatible with or able to take these connectivity steps, they may not be able to present their content using the target display device. And even where compatibility exists, configuration can be inconvenient, time-consuming, frustrating and/or prone to error.

Remote participants may experience even more difficulty in presenting meeting-associated content to local meeting participants via the target display device. This often requires the remote meeting participant to send content to a local computing device (i.e., present in the physical meeting space), which then must be configured to use the display device by a local meeting participant using one of the inconvenient methods described above.

Accordingly, the present discussion relates to a virtual meeting attendee configured to facilitate display of meeting-associated content during a meeting. The virtual meeting attendee may be scheduled into meetings as a meeting participant by users of a computerized meeting platform. A computerized meeting platform may be an electronic/digital service which allows users to schedule and participate in computer-enabled meetings. Users of the platform may schedule meetings, invite other users and virtual meeting attendees, exchange real time audio/video streams, and share meeting-associated content. Once the virtual meeting attendee has been scheduled into and joined a meeting, it is configured to receive meeting-associated content from meeting participants, and output the meeting-associated content for display via a display device associated with the virtual meeting attendee. Because the virtual meeting attendee functions as a participant in the meeting, human meeting participants may easily send meeting-associated content to the virtual meeting attendee in a manner facilitated via the computerized meeting platform, just as human meeting participants ordinarily share meeting-associated content with each other. Accordingly, any computing device which is capable of joining a meeting facilitated by a computerized meeting platform may send meeting-associated content to the virtual meeting attendee. In some implementations, any participant in the meeting may send meeting-associated content to the virtual meeting attendee for display, regardless of whether the meeting participant is present in the same physical space as the virtual meeting attendee, and without taking time to manually attach display cables or configure a wireless presentation service.

FIG. 1 schematically shows a meeting 100, including a number of meeting participants 102. Specifically, FIG. 1 shows meeting participants 102A, 102B, and 102C, each of whom are human meeting participants. Further, FIG. 1 shows meeting participant 102D, which is a virtual meeting attendee associated with a display device 104. The virtual meeting attendee may be configured to, upon being scheduled into a meeting by one or more of the human meeting participants 102A-102C, present itself for the purpose of meeting 100 as a meeting participant, so that meeting-associated content may be sent to it. The virtual meeting attendee, as well as participants 102A and 102B, are all present within a physical space 106 associated with the virtual meeting attendee. Physical space 106 may correspond to a conference room, theater, office, residence, building or any other physical meeting space. The virtual meeting attendee may be located in/near the physical space, and may provide meeting-associated content display capabilities for one or more display devices in the physical space. As indicated, meetings including the virtual attendee may also include remote meeting participants 102C, i.e., not present in physical space 106. As shown in FIG. 1, the virtual meeting attendee is a hardware device attached to the display device, though in other implementations virtual meeting attendees may take other forms, as will be described below.

Each of human meeting participants 102A-102C have associated computing devices 108, which may be operatively coupled with a computerized meeting platform 110, as indicated in the figure by dashed arrows. Computerized meeting platform 110 may be implemented in various ways. Common implementations will include multiple interacting devices, networks, cloud platforms, etc.

Regardless of the particular implementation, this description contemplates topologies that allow computing devices 108 to exchange data with each other and the computerized meeting platform. Such data may include, for example, audio/video streams generated as part of meeting 100. For example, computing device 108A may be configured to record audio and/or video in physical space 106, and send the recorded audio/video to computerized meeting platform 110. The computerized meeting platform may then relay the recorded audio/video to computing device 108C substantially in real time, allowing participant 102C to hear sounds/view events occurring in physical space 106 substantially as they occur. Similarly, computing device 108C may be configured to record and send audio/video from its own local environment to computing device 108A and or 108B, allowing for two-way communication between local and remote meeting participants.

In this same manner, meeting participants may exchange meeting-associated content, which may include pictures, videos, documents, spreadsheets, slideshows, and/or other suitable visual content. For example, a meeting participant may make use of a user interface provided by the computerized meeting platform, allowing the participant to send visual content from the participant's computing device to one or more computing devices associated with other meeting participants, and/or send the same visual content to a virtual meeting attendee for display via a display device. Such visual content may include computer files, screen captures of all or part of an interface currently being presented by the participant's computing device, as well as other suitable computer-readable information. The participant may choose to send meeting-associated content to any/all of the other participants in a meeting, at any time, by selecting a user interface element, for example.

Human participants in a meeting 100 may use virtually any type of computing device. For example, as shown in FIG. 1, computing device 108A is a desktop computer, computing device 108B is a smartphone, and computing device 108C is a tablet device. In general, any computing device capable of communicating with a computerized meeting platform may be used in a meeting as described herein.

In some implementations, computing devices 108 may include software configured to communicate with computerized meeting platform 110. Accordingly, any computing device capable of executing such software may be used as a computing device 108. Further, any suitable number of computing devices 108 may be used. For example, multiple meeting participants in the same area may each use the same computing device to interact with other meeting participants, and/or some meeting participants may use more than one computing device.

Meeting participant 102D, the virtual meeting attendee, is also operatively coupled with computerized meeting platform 110. This allows the virtual meeting attendee to exchange data with the computerized meeting platform 110, as well as the computing devices 108 of other meeting participants 102. Specifically, when the virtual meeting attendee has been scheduled into a meeting as a participant, it may be configured to receive meeting-associated content from computing devices of other participants scheduled into the meeting. Further, the virtual meeting attendee may output the meeting-associated content for display via a display device, such as display device 104, associated with the virtual meeting attendee. As shown in FIG. 1, meeting-associated content 112 is being presented by display device 104, and may therefore be visible to human participants 102A an 102B. Meeting-associated content presented by the display may be sent by local meeting participants 102A/102B, and/or remote meeting participant 102C. Meeting-associated content sent by meeting participants may be sent directly to the virtual meeting attendee, and/or routed through one or more computerized meeting platform servers before arriving at the virtual meeting attendee.

In some implementations, the virtual meeting attendee may be configured to only output meeting-associated content that has been received from computing devices of participants of a same meeting as the meeting that the virtual meeting attendee has been scheduled into. In other words, the virtual meeting attendee will not output meeting-associated content sent by participants of meetings other than the meeting which the virtual meeting attendee is participating in. Similarly, the virtual meeting attendee will not output meeting-associated content sent by users of the computerized meeting platform who are not currently participating in a meeting. This may be accomplished in a number of ways. For example, the virtual meeting attendee may maintain a list of each participant scheduled into the meeting, and only accept/output meeting-associated content received from those participants. Additionally, or alternatively, the computerized meeting platform may determine which meeting-associated content is sent to the virtual meeting attendee, only allowing meeting-associated content sent by participants scheduled into the meeting. Further still, platform users that are not scheduled into the meeting with the virtual meeting attendee may not be provided with the option to send content to the virtual attendee—i.e., the virtual meeting attendee and its content display capability is only visible and accessible to scheduled participants.

Accordingly, a meeting scheduled with the virtual attendee can provide a context in which it can only be used by scheduled participants to present meeting-associated content. Typically, the meeting is facilitated by computerized meeting platform 110. Each of the computing devices, as well as the virtual meeting attendee, is operatively coupled to the computerized meeting platform. This allows any compatible computing device to send meeting-associated content supported by the computerized meeting platform to the virtual meeting attendee for display. By limiting use of the virtual meeting attendee to only meeting participants in a meeting facilitated by the computerized platform, the need to manually configure computing devices and display devices to work together is eliminated. All a user must do in order to present meeting-associated content is join the meeting and send the meeting-associated content to the virtual meeting attendee using a framework established and maintained by the computerized meeting platform. Sending meeting-associated content to the virtual meeting attendee may be performed in a substantially similar manner as sending content to other human participants, as described above, further simplifying the presentation of meeting-associated content.

After inviting users of a computerized meeting platform to a meeting, it may in some cases be desirable to track which of the invited users actually attend and participate in the meeting. Tracking can be difficult, however, in meetings which include multiple local and remote participants. For example, a computerized meeting platform may track the attendance of each meeting participant that joins the meeting using a computing device. However, users who participate in the meeting without using their own computing device (e.g., multiple meeting participants sharing a single computing device) may not be recorded as having attended the meeting.

Accordingly, a virtual meeting attendee as described herein may be configured to identify participants of the meeting, and track attendance of the identified participants. For example, the virtual meeting attendee may track each computing device that joins the meeting, and/or each computing device that sends meeting-associated content to the virtual meeting attendee, and record that the owners of the tracked computing devices attended/participated in the meeting. Additionally, or alternatively the virtual meeting attendee may include an attendance tracking component, which may include one or more of a 1) microphone, configured with supporting software to identify meeting participants via voice recognition, 2) a camera, configured to recognize meeting participants via facial recognition, and 3) a device recognition component, configured to detect presence of computing devices associated with meeting participants in a physical space associated with the virtual meeting attendee.

The microphone and/or camera may be usable to identify both local and remote meeting participants. For example, a microphone may recognize the voice of a meeting participant who is speaking in a physical space associated with the virtual meeting attendee, and/or the voice of a remote meeting participant being played through a speaker. The device recognition component may recognize a variety of suitable computing devices, including devices which are not in use as part of the meeting. For example, the device recognition component may identify a meeting participant's personal device (e.g., smartphone, tablet, laptop computer) via Wi-Fi, Bluetooth, near-field communication, etc., and record the owner of the device as having attended the meeting.

As described above, a meeting as described herein nay be facilitated by a computerized meeting platform. This may allow users of the computerized meeting platform to schedule meetings, and invite other users of the computerized meeting platform to the meeting as participants. In particular, a user of a computerized meeting platform may schedule a virtual meeting attendee into a meeting. This may be done in a number of ways, including selecting the virtual meeting attendee from a list of available meeting participants and scheduling a meeting to occur in a physical space associated with a virtual meeting attendee. In some implementations, the virtual meeting attendee may convey to a user that it is available/not available, that it is associated with a physical space, that a physical space is reserved, etc. To facilitate this, the computerized meeting platform may provide one or more user interfaces, usable for scheduling meetings, viewing/modifying meeting details, and/or interacting with meeting participants during a meeting.

A non-limiting example of an interface 200 provided by a computerized meeting platform is shown in FIG. 2. Interface 200 shows details for an upcoming meeting—i.e., "Meeting A." Interface 200 may be viewable by any number of users of the computerized meeting platform. In some implementations, interface 200 may be visible to all users of the computerized meeting platform, only users who have been invited to the meeting, one or more users with elevated permissions, etc.

Interface 200 includes a list showing the users 202 of the computerized meeting platform who have been invited to the meeting, and a list of the invited users 202 who have confirmed they will be attending. The users 202 shown in FIG. 2 may represent only a small number of the total users of the meeting platform that can schedule and join meetings. Interface 200 also includes a list of the meeting venues/physical spaces available for the scheduled meeting, and shows that "Conference Room C" is the scheduled meeting location. Interface 200 also includes an indication 204, shown as two pairs of asterisks surrounding "Conference Room C," indicating that the physical space "Conference Room C" is associated with a virtual meeting attendee, which may be useful information for meeting planners/schedulers. Interface 200 may in borne examples indicate to users whether the physical space is available, which may involve sending a meeting invitation to a virtual meeting attendee, and notifying the user if the attendee accepts/rejects the indication. In general, an interface provided by a computerized meeting platform may provide any suitable indication that a physical space is associated with a virtual meeting attendee—the indication (two pairs of asterisks) shown in FIG. 2 is not intended to limit the present disclosure. For example, another indication may be some type of icon indicating the display capability available as a result of the virtual attendee's participation.

Figure 3:
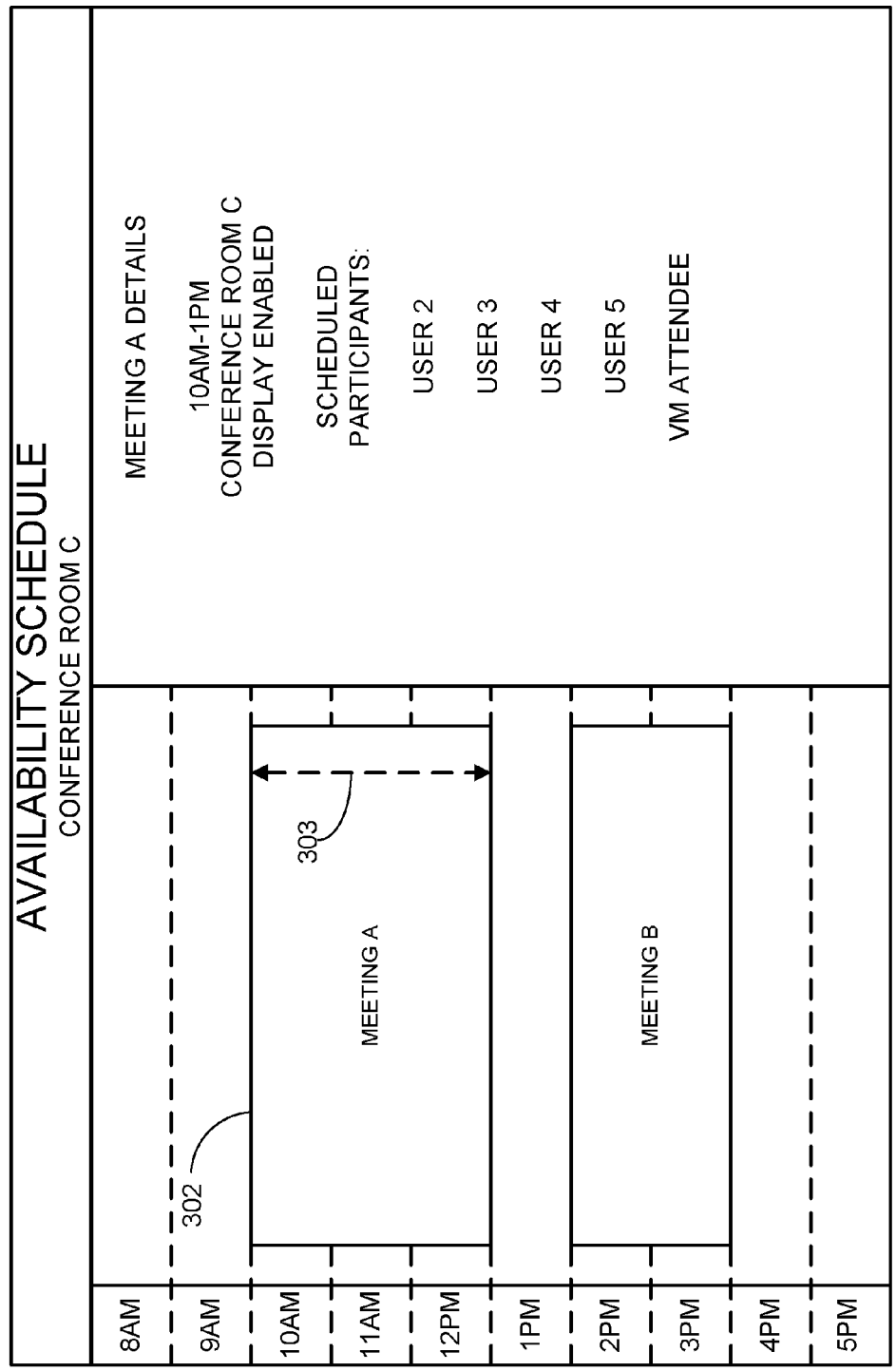
FIG. 3 depicts an example interface showing availability of a physical space associated with a virtual meeting attendee.

FIG. 3 shows another example of an interface 300 that may be provided by a computerized meeting platform. Specifically, interface 300 shows meeting availability for a physical space (i.e., Conference Room C) which is associated with a virtual meeting attendee. As with interface 200, interface 300 may be viewable by any number of users of the computerized meeting platform, including all users of the platform, users who have been invited to a particular meeting, users who have permission to view availability for the physical space, etc.

As shown in FIG. 3, interface 300 includes an indication 302 that the physical space associated with the virtual meeting attendee is reserved for a meeting. Indication 302 may be added to interface 300 responsive to the virtual meeting attendee being scheduled into a meeting. This may have the effect of automatically reserving the physical space associated with the meeting. For example, responsive to a user of the computerized meeting platform scheduling the virtual meeting attendee into a meeting, the virtual meeting attendee may cause an indication, such as indication 302, within the computerized meeting platform that the physical space associated with the virtual meeting attendee is reserved for the meeting. As with indication 204, indication 302 is not intended to limit the present disclosure. Other indications may instead be used to describe availability of a physical space associated with a virtual meeting attendee.

Interface 300 also indicates that a meeting which the virtual meeting attendee has been scheduled into (i.e., Meeting A) occurs over a meeting time period 303. Specifically, Meeting scheduled to run from 10 AM to 1 PM. Accordingly, responsive to the virtual meeting attendee being scheduled into Meeting A occurring during scheduled meeting time period 303, the virtual meeting attendee cannot be scheduled into other meetings that overlap with this time period. Conflict avoidance can be managed by the virtual meeting attendee, which may, for example, maintain its own availability schedule, indicate status, decline scheduling requests, etc. Additionally, or alternatively, the computerized meeting platform may manage virtual meeting attendee availability, refusing to allow users to schedule the virtual meeting attendee where there are overlapping conflicts.

Figure 4:
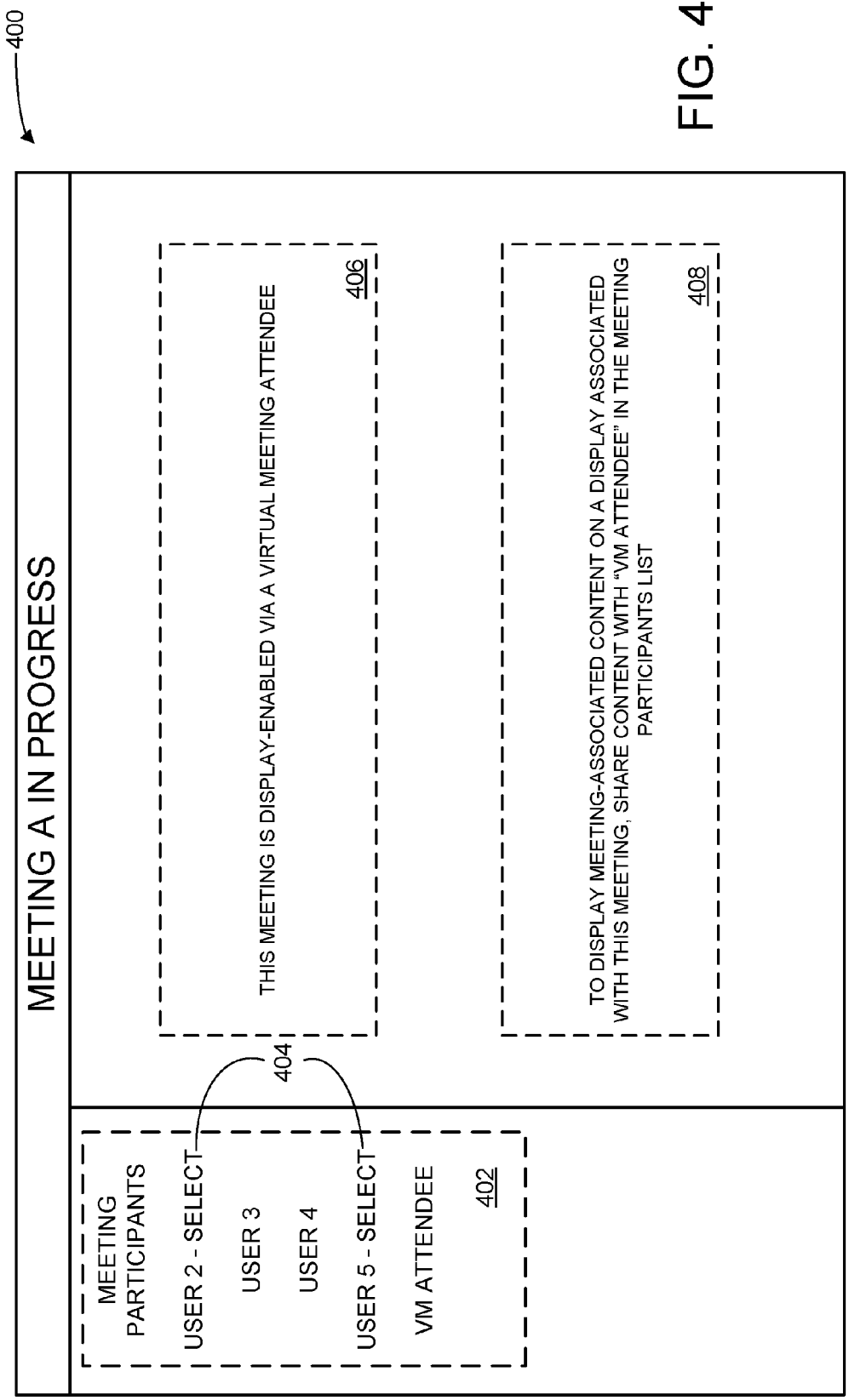
FIG. 4 depicts an example interface provided during a meeting.

FIG. 4 shows another non-limiting example of an interface 400 that may be provided by a computerized meeting platform. Interface 400 may be an example of an interface provided to meeting participants during a meeting. Accordingly, interface 400 may only be viewable to meeting participants, and/or one or more select participants/meeting administrators.

Interface 400 includes a listing of meeting participants 402, which shows each participating user and that virtual meeting attendee has been scheduled as a participant. Interface 400 also indicates that two of the meeting participants are select participants 404 having elevated status, capability or permissions relative to other users. For example, a select participant may be an owner/scheduler of the meeting; a meeting administrator, host, or owner; or an owner/manager of the virtual meeting attendee or physical meeting space. In general, a multi-participant meeting may include one or more select participants. The virtual meeting attendee may be configured to output meeting-associated content received from select participants differently from other participants of the plurality. For example, the virtual meeting attendee may only cause display of meeting-associated content received from select meeting participants. Additionally, or alternatively, meeting-associated content received from select meeting participants may be prioritized differently, processed differently, and/or otherwise handled differently than content received from other participants.

The virtual meeting attendee may additionally provide various indications and/or instructions to meeting participants via interface 400. For example, indication 406 may be used to inform meeting participants that the virtual meeting attendee provides meeting-associated content display capabilities. In another example, interface 400 provides instructions 408, describing how to send meeting-associated content to the virtual meeting attendee for display. Indications 406 and 408 can allow invited participants to quickly learn of the display capability provided by the virtual meeting attendee and how to take advantage of it.

Interfaces 200, 300, and 400, as well as the information and indications shown in relation to the interfaces, are provided solely for the sake of example, and are not intended to limit the scope of the present disclosure. In other implementations, computerized meeting platforms may provide any number of meeting-related interfaces, including any other suitable information and indications.

Figure 5:
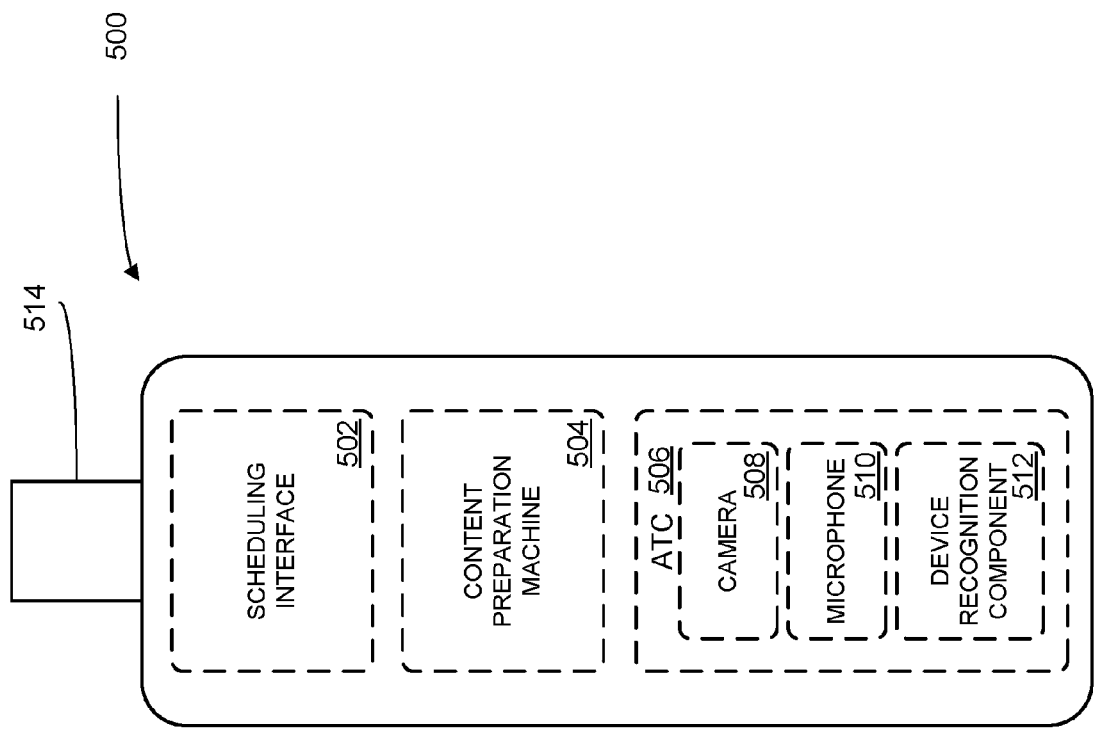
FIG. 5 schematically depicts an example virtual meeting attendee.

FIG. 5 schematically shows an example virtual meeting attendee 500, usable to receive and output meeting-associated content as described above. Virtual meeting attendee 500 includes a scheduling interface 502. Interface 502 couples the attendee to the meeting platform, and allows platform users to schedule the virtual meeting attendee into meetings as a participant. Virtual meeting attendee 500 also includes a content preparation machine 504. Content preparation machine 504 is configured, when the virtual meeting attendee has been scheduled into a meeting as a participant, to (i) receive meeting-associated content from computing devices of other participants scheduled into the meeting and (ii) output the meeting-associated content for display via a display device associated with the virtual meeting attendee.

Preparing meeting-associated content may include performing any converting/transcoding/other processing tasks necessary to prepare received meeting-associated content for display via a display device. Additionally, or alternatively, one or more processing/conversion tasks may be performed by the computerized meeting platform instead of/in addition to the content preparation machine. Content preparation machine 504 may be configured to only output meeting-associated content received from computing devices of participants the meeting that the virtual meeting attendee is scheduled into. Further, content preparation machine 504 may be configured to output meeting-associated content received from select participants differently from other participants, as described above.

Virtual meeting attendee 500 may optionally include an attendance tracking component 506 configured to identify participants of a meeting and track attendance of the identified participants. Attendance tracking component 506 may include one or more of a camera 508 for identifying participants via facial recognition, a microphone 510 for identifying participants via voice recognition, and a device recognition component 512 configured to detect the presence of computing devices associated with meeting participants in a physical space associated with the virtual meeting attendee.

As shown, virtual meeting attendee 500 is a hardware device which may be operatively coupled with a plurality of different display devices. To that effect, virtual meeting attendee includes a display device interface 514, which may be used to removably attach the virtual meeting attendee to any number of different display devices. For example, interface 514 may be a high-definition multimedia interface (HDMI) connector, universal serial bus (USB) connector, or similar. Meeting-associated content prepared by the content preparation machine may be passed through display device 514 to an attached display device, allowing the meeting-associated content to be presented for viewing by meeting participants. In other implementations, virtual meeting attendee 500 may be operatively coupled to a display device wirelessly.

Figure 6:
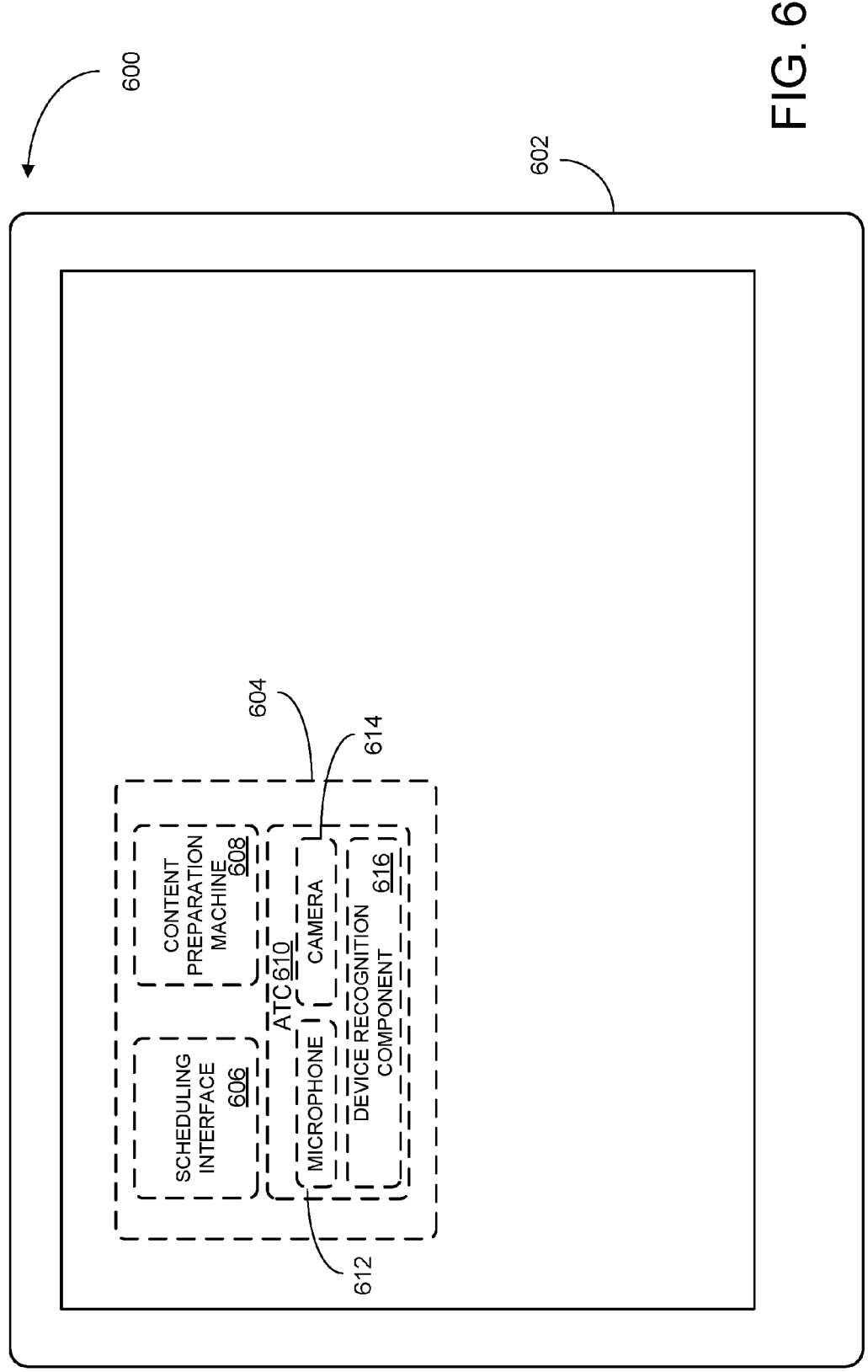
FIG. 6 schematically depicts an example display device including a virtual meeting attendee.

FIG. 6 shows an example display device 600 usable for presenting meeting-associated content. Display device 600 includes a housing 602, and a virtual meeting attendee 604 included in the same housing as display device 600. Accordingly, display device 600 may be manufactured to include meeting-associated content display capabilities, as described above. Virtual meeting attendee 604 may be an integral component of display device 600, and include a scheduling interface 606 and content preparation machine 608, which may have substantially similar functionality to scheduling interface 502 and content preparation machine 504 described above. Further, virtual meeting attendee 604 may optionally include an attendance tracking component 610, which may be substantially equivalent to attendance tracking component 506 described above, and may include one or more of a microphone 612, a camera 614, and a device recognition component 616.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
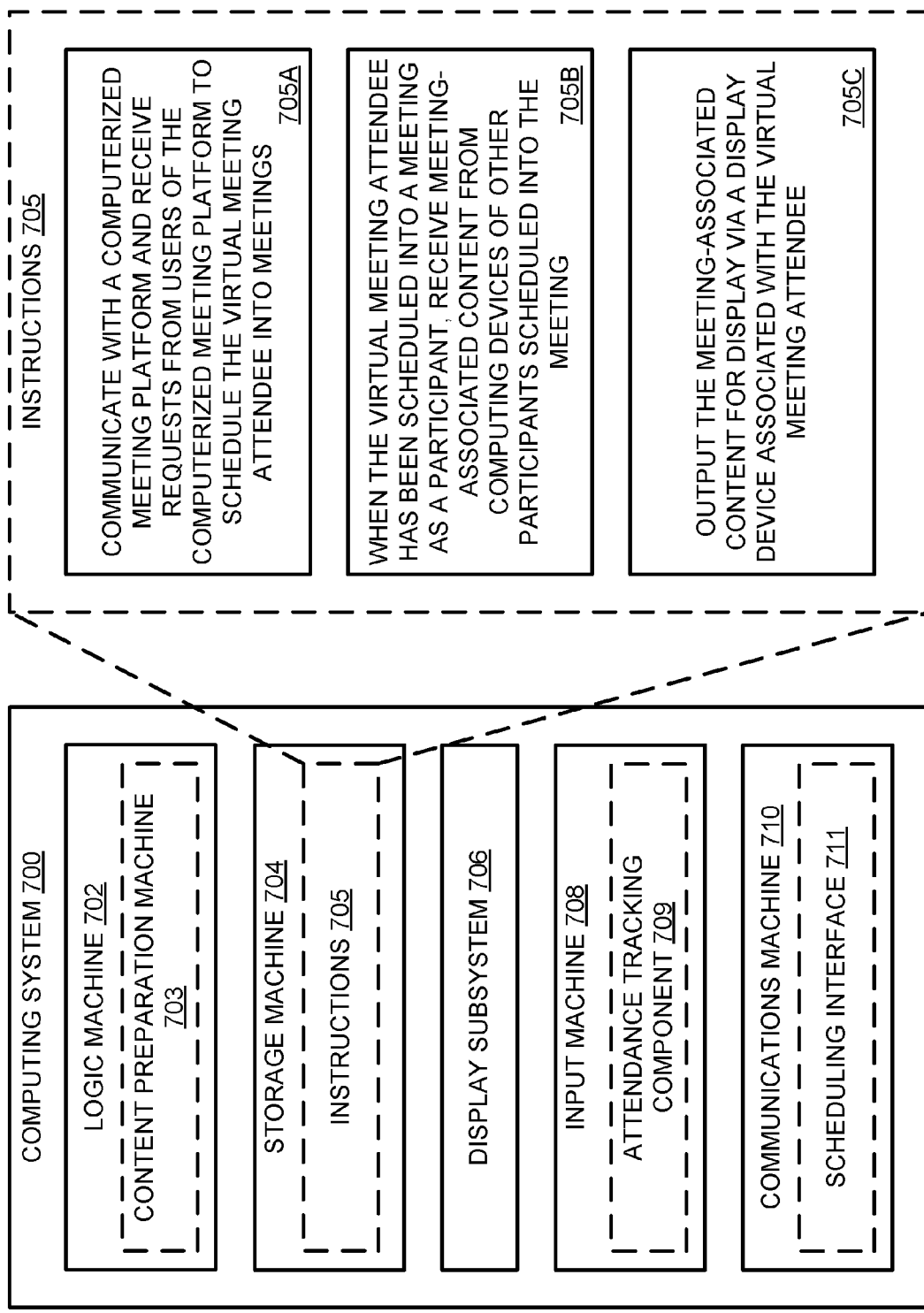
FIG. 7 schematically depicts an example computing system.

FIG. 7 schematically shows a non-limiting embodiment of a computing system 700 that can enact one or more of the methods and processes described above. In particular, computing system 700 may be implemented as a virtual meeting attendee, configured to receive meeting-associated content from meeting participants, and output meeting-associated content for display via a display device associated with the virtual meeting attendee. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices.

Computing system 700 includes a logic machine 702 and a storage machine 704. Computing system 700 may optionally include a display subsystem 706, input subsystem 708, communication subsystem 710, and/or other components not shown in FIG. 7.

Logic machine 702 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Computing system 700 may include a content preparation machine 703, configured to receive meeting-associated content from computing devices of other participants scheduled into a meeting, and output the meeting-associated content for display via a display device associated with the virtual meeting attendee. Content preparation machine 703 may be implemented as one or more of software instructions, firmware, and or one or more processing logic machines, such as logic machine 702.

Storage machine 704 includes one or more physical devices configured to hold instructions executable by the logic machine to implement the methods and processes described herein. When such methods and processes are implemented, the state of storage machine 704 may be transformed—e.g., to hold different data.

Storage machine 704 may include removable and/or built-in devices. Storage machine 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 704 may include volatile, nonvolatile, dynamic, static, read/write, read-only, random-access, sequential-access, location-addressable, file-addressable, and/or content-addressable devices.

It will be appreciated that storage machine 704 includes one or more physical devices. However, aspects of the instructions described herein alternatively may be propagated by a communication medium (e.g., an electromagnetic signal, an optical signal, etc.) that is not held by a physical device for a finite duration.

As shown in FIG. 7, storage machine 704 includes instructions 705. Specifically, instructions 705A are executable by logic machine 702 to communicate with a computerized meeting platform and receive requests from users of the computerized meeting platform to schedule the virtual meeting attendee into meetings. Instructions 705B are executable by the logic machine to, when the virtual meeting attendee has been scheduled into a meeting as a participant, receive meeting-associated content from computing devices of other participants scheduled into the meeting. Instructions 705C are executable by the logic machine to output the meeting-associated content for display via a display device associated with the virtual meeting attendee.

Aspects of logic machine 702 and storage machine 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," "engine" may be used to describe an aspect of computing system 700 implemented to perform a particular function. In some cases, a module, program, or engine may be instantiated via logic machine 702 executing instructions held by storage machine 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display machine 706 may be used to present a visual representation of data held by storage machine 704. This visual representation may take the form of a graphical user interface (GUI). As the herein described methods and processes change the data held by the storage machine, and thus transform the state of the storage machine, the state of display machine 706 may likewise be transformed to visually represent changes in the underlying data. Display machine 706 may include one or more display devices utilizing virtually any type of technology. Such display devices may be combined with logic machine 702 and/or storage machine 704 in a shared enclosure, or such display devices may be peripheral display devices.

When included, input machine 708 may comprise or interface with one or more user-input devices such as a keyboard, mouse, touch screen, or game controller. In some embodiments, the input machine may comprise or interface with selected natural user input (NUI) componentry. Such componentry may be integrated or peripheral, and the transduction and/or processing of input actions may be handled on- or off-board. Example NUI componentry elude a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity. Input machine 708 may include an attendance tracking component 709, usable for identifying meeting participants, and tracking attendance for identified meeting participants, as described above.

When included, communication machine 710 may be configured to communicatively couple computing stem 700 with one or more other computing devices. Communication machine 710 may include wired and/or wireless communication devices compatible with one or more different communication protocols. As non-limiting examples, the communication machine may be configured for communication via a wireless telephone network, or a wired or wireless local- or wide-area network. In some embodiments, the communication machine may allow computing system 700 to send and/or receive messages to and/or from other devices via a network such as the Internet. Communications machine may include a scheduling interface 711, operatively coupled to a computerized meeting platform and configured to enable the virtual meeting attendee to be scheduled into meetings as a participant by users of the computerized meeting platform, as described above.

In an example, a virtual meeting attendee comprises: a scheduling interface operatively coupled to a computerized meeting platform and configured to enable the virtual meeting attendee to be scheduled into meetings as a participant by users of the computerized meeting platform; and a content preparation machine configured, when the virtual meeting attendee has been scheduled into a meeting as a participant, to receive meeting-associated content from computing devices of other participants scheduled into the meeting output the meeting-associated content for display via a display device associated with the virtual meeting attendee. In this example or any other example, the virtual meeting attendee further comprises an attendance tracking component configured to identify participants of the meeting and track attendance of the identified participants. In this example or any other example, the attendance tracking component comprises one or more of a microphone for identifying participants via voice recognition, a camera for identifying participants, and a device recognition component configured to detect the presence of computing devices associated with meeting participants in a physical space associated with the virtual meeting attendee. In this example or any other example, the computerized meeting platform provides an indication to users of the computerized meeting platform that a physical space is associated with the virtual meeting attendee. In this example or any other example, scheduling the virtual meeting attendee into a meeting causes an indication within the computerized meeting platform that a physical space associated with the virtual meeting attendee is reserved for the meeting. In this example or any other example, responsive to the virtual meeting attendee being scheduled into a meeting occurring during a scheduled meeting time period, the virtual meeting attendee is configured so that it is not schedulable into other meetings that overlap with the scheduled meeting time period. In this example or any other example, the virtual meeting attendee provides an indication to meeting participants that it provides meeting-associated content display capabilities. In this example or any other example, the virtual meeting is configured to provide instructions to meeting participants describing how to send meeting-associated content to the virtual meeting attendee for display. In this example or any other example, the content preparation machine is configured to only output meeting-associated content that has been received from computing devices of participants of a same meeting as the meeting that the virtual meeting attendee is scheduled into. In this example or any other example, the meeting includes a plurality of participants, one or more participants of the plurality being select participants, the virtual meeting attendee being configured to output meeting-associated content from select participants differently than other participants of the plurality. In this example or any other example, the virtual meeting attendee is a hardware device which may be operatively coupled with a plurality of different display devices. In this example or any other example, the virtual meeting attendee is included in e housing as the display device.

In an example, a virtual meeting attendee comprises: a logic machine; and a storage machine holding instructions executable by the logic machine, the instructions including: instructions to communicate with a computerized meeting platform and receive requests from users of the computerized meeting platform to schedule the virtual meeting attendee into meetings; instructions to, when the virtual meeting attendee has been scheduled into a meeting as a participant, receive meeting-associated content from computing devices of other participants scheduled into the meeting; and instructions to output the meeting-associated content for display via a display device associated with the virtual meeting attendee. In this example or any other example, the instructions further include instructions to identify participants of the meeting and track attendance of the identified participants. In this example or any other example, scheduling the virtual meeting attendee into a meeting causes an indication within the computerized meeting platform that a physical space associated with the virtual meeting attendee is reserved for the meeting. In this example or any other example, responsive to the virtual meeting attendee being scheduled into a meeting occurring during a scheduled meeting time period, the virtual meeting attendee is configured so that it is not schedulable into other meetings that overlap with the scheduled meeting time period. In this example or any other example, the virtual meeting attendee provides an indication to meeting participants that it provides meeting-associated content display capabilities. In this example or any other example, the virtual meeting attendee is configured so that only meeting-associated content that has been received from computing devices of participants of a same meeting as the meeting that the virtual meeting attendee is scheduled into is output for display. In this example or any other example, the virtual meeting attendee is a hardware device which may be operatively coupled with a plurality of different display devices.

In an example, a virtual meeting attendee comprises: a scheduling interface operatively coupled to a computerized meeting platform and configured to enable the virtual meeting attendee to be scheduled into meetings as a participant by users of the computerized meeting platform; an attendance tracking component configured to identify participants of the meeting and track attendance of the identified participants; a content preparation machine configured, when the virtual meeting attendee has been scheduled into a meeting as a participant, to (i) receive meeting-associated content from computing devices of other participants scheduled into the meeting and (ii) output the meeting-associated content for display via a display device associated with the virtual meeting attendee, the virtual meeting attendee being removably affixable to and usable with a plurality of different display devices; where scheduling the virtual meeting attendee into a meeting causes an indication within the computerized meeting platform that a physical space associated with the virtual meeting attendee is reserved for the meeting; and where responsive to the virtual meeting attendee being scheduled into a meeting occurring during a scheduled meeting time period, the virtual meeting attendee is configured so that it is not schedulable into other meetings that overlap with the scheduled meeting time period.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure, includes all novel and nonobvious combinations and subcombinations of the various processes, systems and configurations, and other features, functions, acts, and/or properties disclosed herein, as well as any and all equivalents thereof.

The invention claimed is:

1. A virtual meeting attendee, comprising:
   a scheduling interface operatively coupled to a computerized meeting platform and configured to enable the virtual meeting attendee to be scheduled into meetings as a computerized, non-human participant by human users of the computerized meeting platform; and
   a content preparation machine configured, when the virtual meeting attendee has been scheduled into a meeting as a computerized, non-human participant, to (i) receive meeting-associated content from computing devices of human participants scheduled into the meeting and (ii) output the meeting-associated content for display via a display device associated with the virtual meeting attendee.

2. The virtual meeting attendee of claim 1, further comprising an attendance tracking component configured to identify human participants of the meeting and track attendance of the identified human participants.

3. The virtual meeting attendee of claim 2, where the attendance tracking component comprises one or more of a microphone for identifying human participants via voice recognition, a camera for identifying human participants, and a device recognition component configured to detect the presence of computing devices associated with human meeting participants in a physical space associated with the virtual meeting attendee.

4. The virtual meeting attendee of claim 1, where the computerized meeting platform provides an indication to users of the computerized meeting platform that a physical space is associated with the virtual meeting attendee.

5. The virtual meeting attendee of claim 1, where scheduling the virtual meeting attendee into a meeting causes an indication within the computerized meeting platform that a physical space associated with the virtual meeting attendee is reserved for the meeting.

6. The virtual meeting attendee of claim 1, where responsive to the virtual meeting attendee being scheduled into a meeting occurring during a scheduled meeting time period, the virtual meeting attendee is configured so that it is not schedulable into other meetings that overlap with the scheduled meeting time period.

7. The virtual meeting attendee of claim 1, where the virtual meeting attendee provides an indication to human meeting participants that it provides meeting-associated content display capabilities.

8. The virtual meeting attendee of claim 1, where the virtual meeting is configured to provide instructions to human meeting participants describing how to send meeting-associated content to the virtual meeting attendee for display.

9. The virtual meeting attendee of claim 1, where the content preparation machine is configured to only output meeting-associated content that has been received from computing devices of human participants of a same meeting as the meeting that the virtual meeting attendee is scheduled into.

10. The virtual meeting attendee of claim 1, where the meeting includes a plurality of human participants, one or more human participants of the plurality being select human participants, the virtual meeting attendee being configured to output meeting-associated content from select human participants differently than other human participants of the plurality.

11. The virtual meeting attendee of claim 1, where the virtual meeting attendee is a hardware device which may be operatively coupled with a plurality of different display devices.

12. The virtual meeting attendee of claim 1, where the virtual meeting attendee is included in a same housing as the display device.

13. A virtual meeting attendee, comprising:
   a logic machine; and
   a storage machine holding instructions executable by the logic machine, the instructions including:
      instructions to communicate with a computerized meeting platform and receive requests from human users of the computerized meeting platform to schedule the virtual meeting attendee into meetings as a computerized, non-human participant;
      instructions to, when the virtual meeting attendee has been scheduled into a meeting as a computerized, non-human participant, receive meeting-associated content from computing devices of human participants scheduled into the meeting; and
      instructions to output the meeting-associated content for display via a display device associated with the virtual meeting attendee.

14. The virtual meeting attendee of claim 13, the instructions further including instructions to identify human participants of the meeting and track attendance of the identified human participants.

15. The virtual meeting attendee of claim 13, where scheduling the virtual meeting attendee into a meeting causes an indication within the computerized meeting platform that a physical space associated with the virtual meeting attendee is reserved for the meeting.

16. The virtual meeting attendee of claim 13, where responsive to the virtual meeting attendee being scheduled into a meeting occurring during a scheduled meeting time period, the virtual meeting attendee is configured so that it is not schedulable into other meetings that overlap with the scheduled meeting time period.

17. The virtual meeting attendee of claim 13, where the virtual meeting attendee provides an indication to human meeting participants that it provides meeting-associated content display capabilities.

18. The virtual meeting attendee of claim 13, where the virtual meeting attendee is configured so that only meeting-associated content that has been received from computing devices of human participants of a same meeting as the meeting that the virtual meeting attendee is scheduled into is output for display.

19. The virtual meeting attendee of claim 13, where the virtual meeting attendee is a hardware device which may be operatively coupled with a plurality of different display devices.

20. A virtual meeting attendee, comprising:
- a scheduling interface operatively coupled to a computerized meeting platform and configured to enable the virtual meeting attendee to be scheduled into meetings as a computerized, non-human participant by human users of the computerized meeting platform;
- an attendance tracking component configured to identify human participants of the meeting and track attendance of the identified human participants;
- a content preparation machine configured, when the virtual meeting attendee has been scheduled into a meeting as a computerized, non-human participant, to (i) receive meeting-associated content from computing devices of human participants scheduled into the meeting and (ii) output the meeting-associated content for display via a display device associated with the virtual meeting attendee, the virtual meeting attendee being removably affixable to and usable with a plurality of different display devices;
- where scheduling the virtual meeting attendee into a meeting causes an indication within the computerized meeting platform that a physical space associated with the virtual meeting attendee is reserved for the meeting; and
- where responsive to the virtual meeting attendee being scheduled into a meeting occurring during a scheduled meeting time period, the virtual meeting attendee is configured so that it is not schedulable into other meetings that overlap with the scheduled meeting time period.

\* \* \* \* \*